United States Patent
Kennedy

(10) Patent No.: US 10,900,590 B2
(45) Date of Patent: *Jan. 26, 2021

(54) LIMIT SWITCH FOR RISING STEM GATE VALVES

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,277

(22) Filed: Mar. 3, 2020

(65) Prior Publication Data

US 2020/0200291 A1 Jun. 25, 2020

Related U.S. Application Data

(63) Continuation of application No. 16/124,662, filed on Sep. 7, 2018, now Pat. No. 10,677,374, which is a
(Continued)

(51) Int. Cl.
*F16K 35/16* (2006.01)
*F16K 27/04* (2006.01)
(Continued)

(52) U.S. Cl.
CPC .............. *F16K 35/16* (2013.01); *F16K 3/00* (2013.01); *F16K 3/02* (2013.01); *F16K 27/044* (2013.01);
(Continued)

(58) Field of Classification Search
CPC ... F16K 35/16; F16K 3/02; F16K 3/00; F16K 37/0041; F16K 27/044; H01H 3/0206; Y10T 137/8242
(Continued)

(56) References Cited

U.S. PATENT DOCUMENTS 792,258 A 6/1905 Grinnell
862,551 A 8/1907 Gardner
(Continued)

OTHER PUBLICATIONS

Outside Screw and Yoke Valve Supervisory Switch, https://www.google.com/url?sa=t&rct=j&q=&esrc=s&source=web&cd=1&cad=rja&uact=8&ved=0ahUKEwjf7ZeVw6baAhUC84MKHeDYAVEQFghlMAA&url=https%3A%2F%2Fwww.pottersignal.com%2Fproduct%2Fdatasheet%2F5401525_OSYSU.pdf&usg=AOvVaw1klCmP9rR1OX9bc5zSfLvT, Aug. 2015.
(Continued)

*Primary Examiner* — John Bastianelli
(74) *Attorney, Agent, or Firm* — Brown & Michaels, PC

(57) ABSTRACT

A limit switch assembly for a rising-stem valve includes an operating lever actuator element mounted to an outer end of an actuator arm. An electrical switch mounted adjacent the outer end has an operating lever. When the actuator arm is in an outward position, the operating lever actuator element retains the operating lever in a first position wherein the electrical switch is in a first state, and when the actuator arm is in an inward position the operating lever is in a second position wherein the electrical switch is in a second state. An adjustment nut is mounted to the outer end adjacent the operating lever actuator element, and the operating lever actuator element and the adjustment nut are configured to be adjusted along a longitude of the actuator arm to change a distance the operating lever actuator element must travel to move the operating lever into the first position.

5 Claims, 4 Drawing Sheets

Related U.S. Application Data continuation of application No. 15/686,401, filed on Aug. 25, 2017, now Pat. No. 10,088,073.

(51) Int. Cl.
| | | |
|---|---|---|
| *F16K 3/00* | (2006.01) | |
| *F16K 37/00* | (2006.01) | |
| *F16K 3/02* | (2006.01) | |
| *H01H 3/02* | (2006.01) | |

(52) U.S. Cl.
CPC ....... *F16K 37/0041* (2013.01); *H01H 3/0206* (2013.01); *Y10T 137/8242* (2015.04)

(58) Field of Classification Search
USPC .................. 251/326–329; 137/554; 116/277; 200/61.86
See application file for complete search history.

(56) References Cited

U.S. PATENT DOCUMENTS

| | | | |
|---|---|---|---|
| 896,864 | A | 8/1908 | Spamer |
| 1,952,397 | A | 3/1934 | Turner |
| 3,367,365 | A | 2/1968 | Stevens |
| 3,671,692 | A | 6/1972 | Potter et al. |
| 4,158,008 | A | 6/1979 | Weitz et al. |
| 4,383,546 | A | 5/1983 | Walters, Jr. |
| 4,569,365 | A | 2/1986 | Namand |
| 4,782,333 | A | 11/1988 | Merchant |
| 5,031,660 | A | 7/1991 | Magee |
| 5,218,994 | A | 6/1993 | Jeschke |
| 5,538,037 | A | 6/1996 | Pizao |
| 5,771,926 | A | 6/1998 | Medal et al. |
| 6,009,899 | A * | 1/2000 | Polutnik ................ F16K 3/029 137/556.3 |
| 7,152,615 | B1 | 12/2006 | Engdahl |
| 7,328,719 | B2 | 2/2008 | Madden |
| 10,088,073 | B1 | 10/2018 | Kennedy |
| 2001/0035510 | A1 | 11/2001 | Oh |

OTHER PUBLICATIONS

Resilient Wedge Gate Valve, http://www.kennedyvalve.com/upl/downloads/catalog/products/gate-valve-specification-sheet-6582a515.pdf, Sep. 11, 2013.
AWWA Dbl. Disc Parallel Seat IBBM Gate Valve, https://www.google.com/url?sa=t&rct=j&q=&esrc=s&source=web&cd=1&ved=0ahUKEwiMleG7xKbaAhXHyoMKHfWiBG0QFggnMAA&url=http%3A%2F%2Fwww.kennedyvalve.com%2Fupl%2Fdownloads%2Fcatalog%2Fproducts%2Fsubmittal-sheet-ddgv-3afc8d62.pdf&usg=AOvVaw2NuKPD2YdCcNuKiaY0y8X2, Dec. 15, 2009.
Fire Protection Gate Valves, http://www.nibco.com/Valves/Fire-Protection/Gate-Valves/, accessed Aug. 24, 2016.

* cited by examiner

LIMIT SWITCH FOR RISING STEM GATE VALVES

REFERENCE TO RELATED APPLICATIONS

This application is a continuation of co-pending U.S. patent application Ser. No. 16/124,662, entitled "Limit Switch for Rising Stem Gate Valves", filed Sep. 7, 2018, which is a continuation of U.S. patent application Ser. No. 15/686,401, entitled "Limit Switch for Rising Stem Gate Valves", filed on Aug. 25, 2017, and now issued as U.S. Pat. No. 10,088,073. The aforementioned applications are incorporated herein by reference.

BACKGROUND OF THE INVENTION

Field of the Invention

The invention pertains to the field of valves. More particularly, the invention pertains to limit switches for rising-stem type valves.

Description of Related Art

Gate valves are often used in fire protection applications to close off water mains. Referring to FIG. 1, such valves have a valve body 4 with flanges on an inlet side 5 and outlet side 6. A gate 8 fits in a channel 7 inside the valve body 4. When the gate 8 is fully lowered into the channel 7 water flow from inlet 5 to outlet 6 is blocked. When the gate 8 is raised, water can flow freely through the body 4. The gate 8 is actuated by a stem 9, which has a threaded portion 10 near the upper end and a non-threaded portion 11 between the threaded portion 10 and the lower end which is coupled to the gate 8 by a swivel which allows the stem 9 to turn while the gate 8 is prevented from swiveling by the channel 7. The stem 9 extends upward through valve cover 2, which is mounted on the valve upper flange 3. A yoke 1 guides the stem 9 to the valve hand wheel 13, which is held on the end of the stem 9 by a hold down nut 14.

In rising-stem type valves, when the gate 8 is raised or lowered, the entire stem 9 moves upward or downward through the yoke 1 as the threaded part 10 of the stem 9 threads through the yoke nut 12 on the top of the yoke 1.

In some systems it is necessary to be able to determine remotely if the valve is open or closed. For example, in a fire-protection sprinkler system, it is important that all of the mains valves be open so that the sprinklers can protect the sprinkled area, and it is desirable that a fire alarm system which monitors flow in the sprinkler system to detect actuation should also be able to warn if the sprinklers were shut off by manual operation of the valves.

On a ball valve system, it is relatively easy to tell if the valve is on or off, since the valve actuator lever will either be in the open position (usually parallel with the pipe) or the closed position (usually perpendicular to the pipe). A switch can be mounted to close when the lever is in the open position, to signal the readiness of the valve to a remote system.

In a gate valve, the hand wheel 13 must be turned many times to fully raise or lower the gate 8, and there is no one "on" or "off" position of the wheel 13. In the prior art, installers have mounted an after-market supervisory or limit switch, such as the OSYSU series supervisory switches made by Potter Electric Signal Company in St. Louis, Mo. to the yoke 1, to provide the monitoring switch signal for the monitoring system. The switch is mounted with a clamp or U-bolts or the like to the open side of the yoke 1 at a position chosen by the installer, with a trip rod from the switch riding on the side of the stem 9 of the valve. During installation, after mounting the switch, the valve is operated to the fully open position, and the installer marks the stem 9 where the trip rod hits the stem 9. The installer then removes the switch and manually files a groove in the stem 9 where he marked it. The switch is then re-mounted at the same spot as before, so that the trip rod drops into the filed groove and actuates the switch.

SUMMARY OF THE INVENTION

In an embodiment of the invention, a limit switch assembly for a rising-stem valve having a stem with a diameter and a groove marking a desired stem position, includes: an actuator arm having an inner end and an outer end, the inner end of the actuator arm forming a follower; an operating lever actuator element mounted to the outer end of the actuator arm; an electrical switch having an operating lever, the electrical switch mounted adjacent to the outer end of the actuator arm such that when the actuator arm is in an outward position the operating lever actuator element contacts and retains the operating lever in a first position such that the electrical switch is in a first state of operation, and when the actuator arm is in an inward position the operating lever is in a second position such that the electrical switch is in a second state of operation; a bias spring biasing the actuator arm toward the inward position; and an adjustment nut mounted to the outer end of the actuator arm adjacent the operating lever actuator element, the operating lever actuator element and the adjustment nut configured to be adjusted along a longitude of the actuator arm to change a distance the operating lever actuator element must travel in order to put the operating lever in the first position.

DETAILED DESCRIPTION OF THE INVENTION

Figure 1:
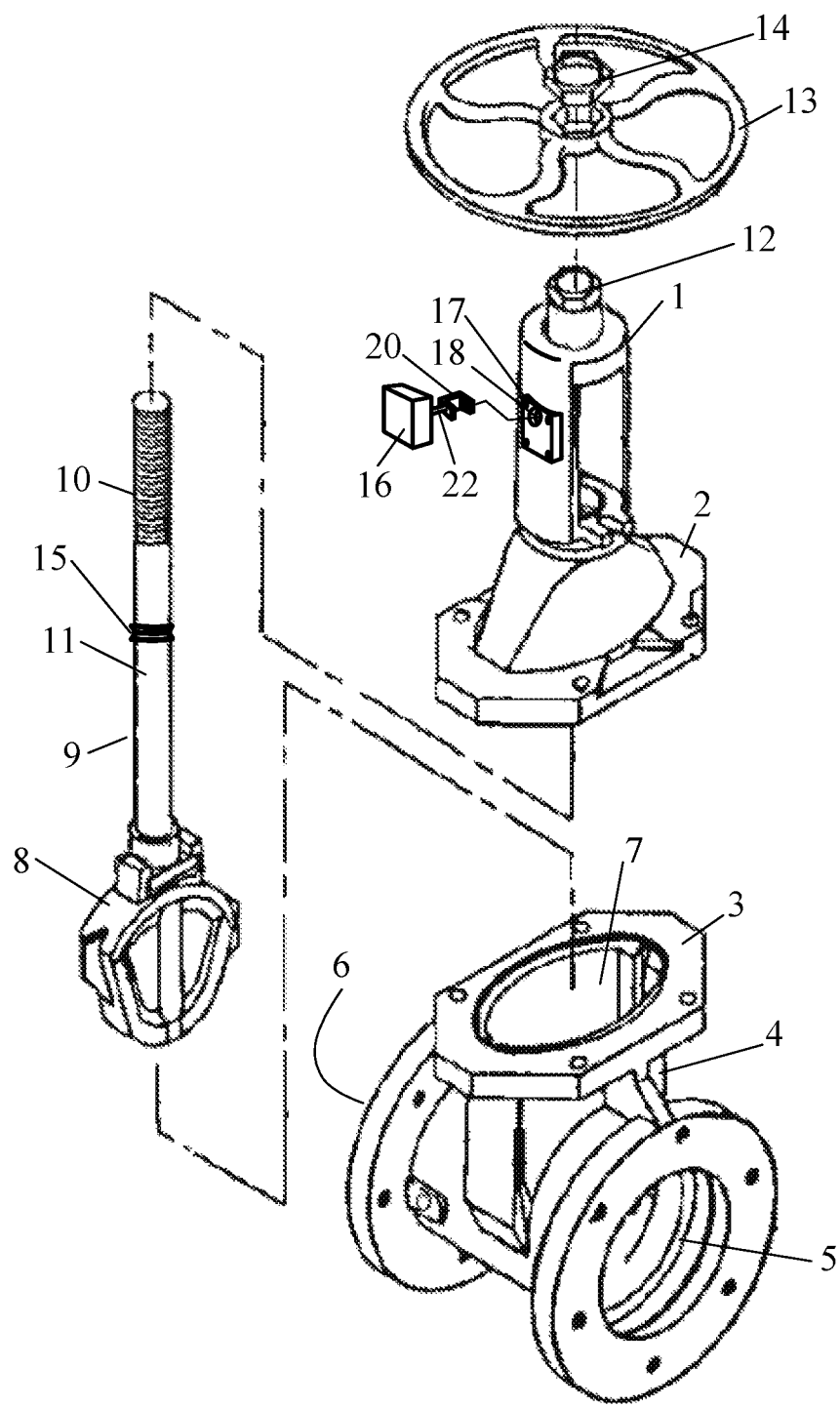
FIG. 1 shows an exploded view of a gate valve.

Referring to FIG. 1, the parts of the valve which are conventional were discussed in the background section, above. The novel valve has a mounting platform 17 formed into the side of the yoke 1 for mounting the limit switch assembly 16. Alternatively, there could be a separate mounting plate which mounts the switch 16 to the yoke 1 with screws or the like. A hole 18 is bored through a side of the yoke 1, through which the actuator rod 22 and bracket 20 can extend inside the interior of the yoke 1.

Figure 4:
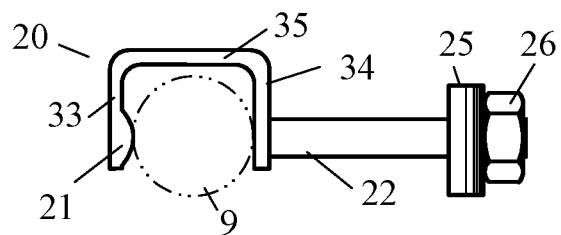
FIG. 4 shows a top view of a first embodiment of the actuator arm of the limit switch.

FIG. 4 shows a view of a first embodiment of the actuator arm 22. On the outer end of the actuator arm 22, a radius washer 25 is held on by a nut 26 threaded onto the arm 22. A bracket 20 in this embodiment is U-shaped, with an outer leg 33, inner leg 34 mounted to the inner end of the actuator arm 22, and a base 35 between the inner leg 34 and outer leg 33. The inner leg 34 can be mounted in a permanent fashion by press-fit, or by welding or brazing, in which case hole 18 would need to be large enough to pass the bracket 20. Alternatively, the inner end of the actuator rod 22 could be threaded into a threaded hole in the inner leg 34 of bracket 20, in which case the hole 18 would only need to be large enough to pass the actuator rod 22, and the bracket 20 would be assembled onto the actuator rod 22 after the switch 16 is mounted on the yoke 1. A follower 21 is provided on the inside of the outer leg 33 of the U-shaped bracket 20. The base 35 is made larger than the diameter of the stem 9, at least large enough so that the stem 9 fits between the inside arm 34 and the follower 21 on the inside of the outside arm 33. The length of the inside arm 34 and the outside arm 33 is at least one-half of the diameter of the stem 9, so that when the bracket 20 is around the stem 9, the follower 21 contacts the side of the stem 9 opposite the actuator arm 22.

Figure 5:
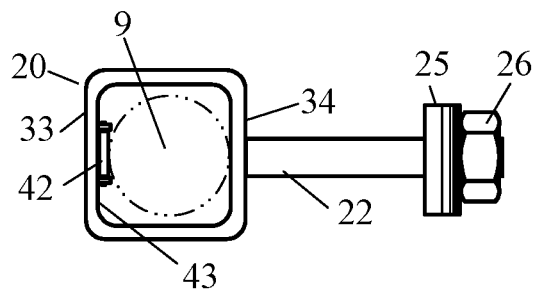
FIG. 5 shows a top view of a second embodiment of the actuator arm of the limit switch.

FIG. 5 shows a view of a second embodiment of the actuator arm 22. This embodiment differs from the embodiment in that the actuator bracket 20 is a closed form, shown in FIG. 5 as a rectangle, although it could be round or some other shape. FIG. 5 also shows an embodiment in which the follower is in the form of a roller 42 mounted on an inside surface 43 of the bracket 20.

Figure 2:
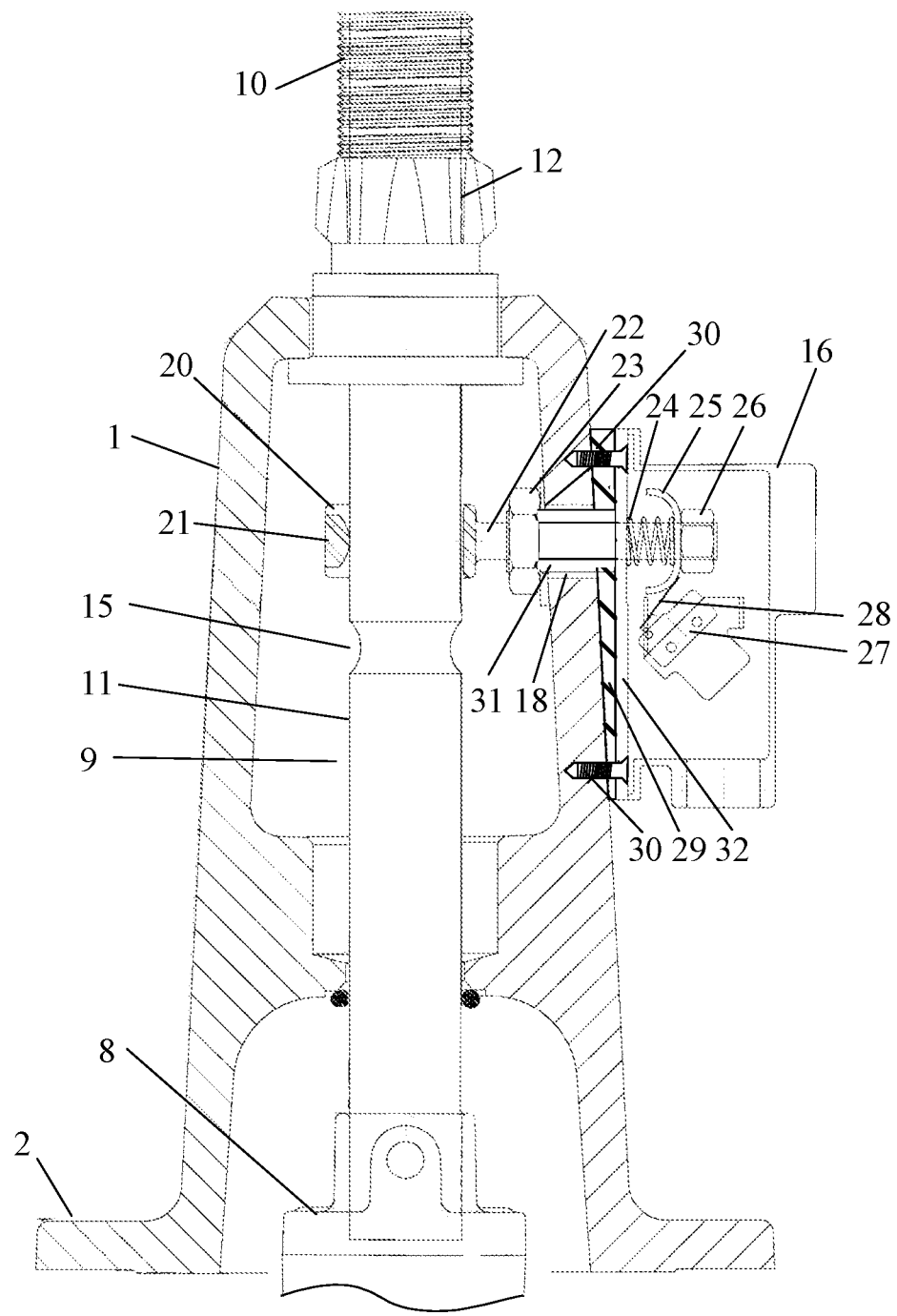
FIG. 2 shows a cut-through view of the yoke for a gate valve with the stem in a lowered position and the limit switch disengaged with a groove around the stem.
Figure 3:
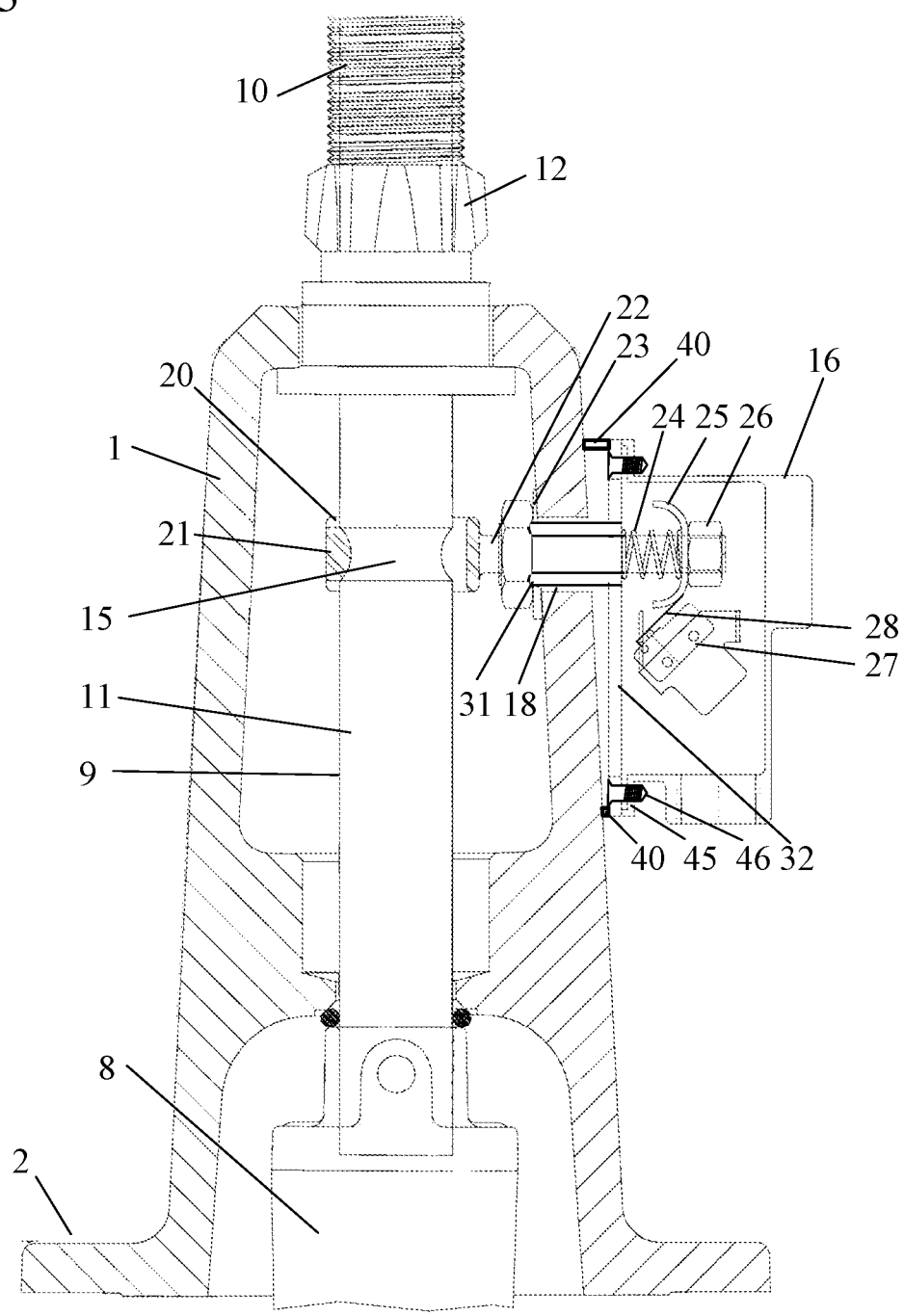
FIG. 3 shows a cut-through view of the yoke for a gate valve with the stem in a raised position and the limit switch engaged in a groove around the stem.

FIGS. 2 and 3 show a cut-through view of the valve yoke 1, with the stem nut 12 at the top of the yoke 1. The threaded portion 10 of the stem 9 is threaded into the stem nut 12, so that turning the stem 9 causes the stem 9 to be moved up and down, raising and lowering the gate 8 within the valve. It will be understood that the threaded portion 10 and gate 8 are truncated in these figures for illustrative purposes.

A circumferential groove 15 is formed around the unthreaded portion 11 of the stem 9, at a location along the length of the stem 9 selected such that when the gate 8 is in the desired position (either open or closed or some other selected position), the groove 11 is aligned with the center of the hole 18. It will be understood that more than one groove 15 could be formed, to allow a valve to have more than one desired position—for example, both an "open" and a "closed" position.

In the embodiment of FIG. 2, the limit switch assembly 16 is shown mounted to the side of the yoke 1 on a mounting plate 29 fastened to the side of the yoke 1 by screws 30. The base plate 32 of the limit switch assembly 16 is mounted to the yoke 1 by means of a mounting boss or tube 31, held to the inside of the yoke 1 by a nut 23.

FIG. 3 shows a different arrangement for mounting the limit switch assembly 16, in which the mounting plate 29 is replaced by a plurality of feet 40, which are of differing sizes to accommodate the taper and circular shape of the yoke 2. In this arrangement, screws 46 can be provided to hold switch cover 45 on the base plate 32.

With the limit switch assembly 16 mounted on the yoke 1, whether to a mounting platform 17 as shown in FIG. 1, or using a mounting plate 29 as shown in FIG. 2, or with feet 40 as in FIG. 3, the actuator arm 22 passes through the center of the hole 18, with the bracket 20 around the stem 9. A bias spring 24 presses on the base plate 32 and the radius washer 25 to bias the actuator arm 22 outward from the yoke 1, pressing the follower 21 against the side of the stem 9. An electrical switch 27 is mounted inside the limit switch assembly 16 in a location such that the operating lever 28 of the electrical switch 27 is operated by the radius washer 25 when the actuating arm 22 is in an outward position, and is not operated by the radius washer 25 when the actuating arm 22 is in an inward position.

The electrical switch 27 can be, for example, a miniature switch (commonly called a "microswitch") as made by Honeywell and many other manufacturers. The electrical switch 27 can be of any electrical kind required by the application, for example a single-pole-double throw (SPDT) type, which would have a normally-open (NO) terminal, a normally-closed (NC) terminal, and a common terminal, such that when the switch is operated the common terminal is connected to the NO terminal, and when the switch is not operated the common terminal is connected to the NC terminal. This would permit the limit switch to be used with systems which require either contact closure or contact opening at the desired position, although it will be understood that other contact arrangements can be used within the teachings of the invention.

FIG. 2 shows the valve with the gate 8 and stem 9 in a position other than the desired position. In this position, the follower 21 rides on the side of the unthreaded portion 11 of the stem 9 under the force of the bias spring 24. This holds the actuator arm 22 in an inward position, such that the radius washer 25 does not operate the operating lever 28 of the electrical switch 27. If an SPDT type of switch 27 were used, in this position there would be a closed circuit between the NC terminal of the electrical switch 27 and the common terminal, and an open circuit between the NO terminal and the common terminal.

When the stem 9 and gate 8 are moved to the desired position (shown in FIG. 3 as a raised, valve-opened position), the follower 21 on the bracket 20 of the actuator arm 22 is pulled by the force of the bias spring 24 to drop into the groove 15. This moves the actuator arm 22 to an outward position, in which the radius washer 25 contacts operating lever 28 to operate electrical switch 27. If an SPDT type of switch 27 were used, in this position there would be a closed circuit between the NO terminal of the electrical switch 27 and the common terminal, and an open circuit between the NC terminal and the common terminal.

Figure 6:
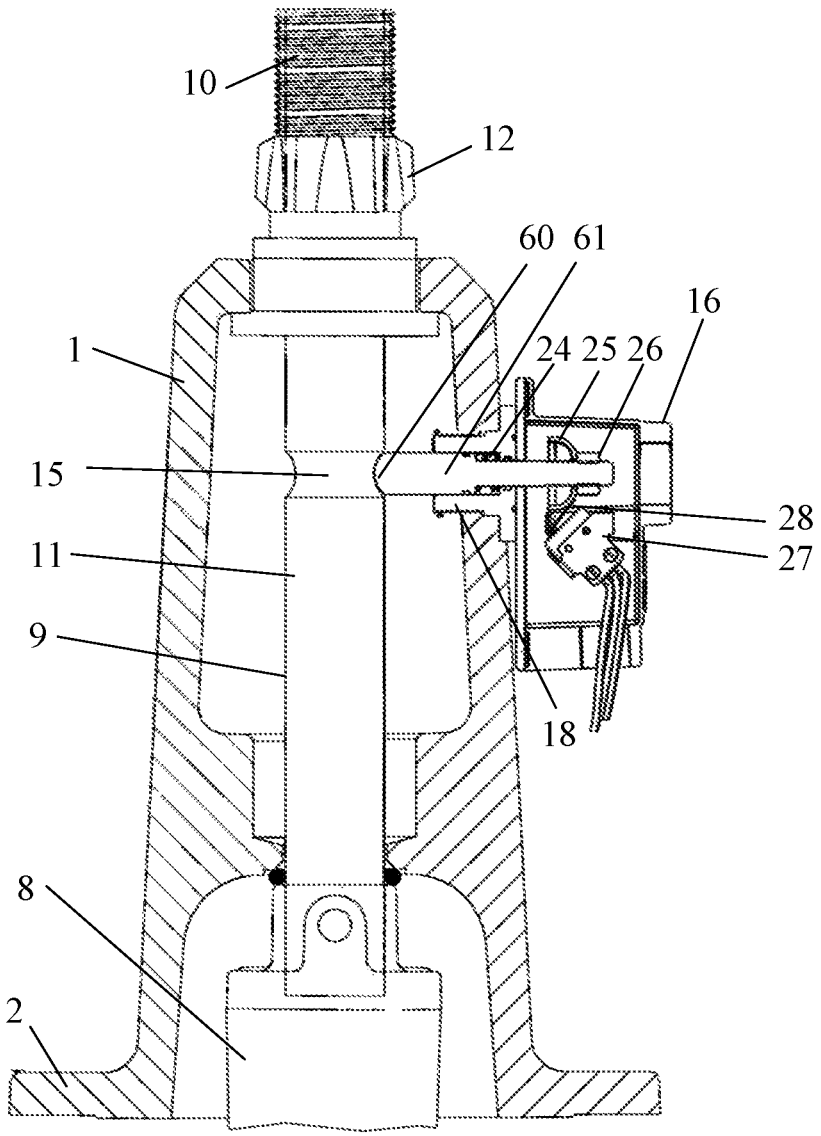
FIG. 6 shows a cut-through view of the yoke for a gate valve with the stem in a raised position and the limit switch engaged in a groove around the stem, in another embodiment of the limit switch.

FIG. 6 shows a cut-through view of the yoke for a gate valve with the stem in a raised position, and the limit switch engaged in a groove around the stem, corresponding to FIG. 3. In this embodiment, the actuator arm 61 of the limit switch is biased toward the stem 9 by bias spring 24, rather than away from the stem as shown in FIGS. 2-5. The follower 60 is formed by the end of the actuator arm 61, so that when the follower 60 drops into groove 15, the switch 27 is operated.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A limit switch assembly for a rising-stem valve having a stem with a diameter and a groove marking a desired stem position, comprising:
    an actuator arm having an inner end and an outer end, the inner end of the actuator arm forming a follower that follows the stem;
    an operating lever actuator element mounted to the outer end of the actuator arm;

an electrical switch having an operating lever, the electrical switch mounted adjacent to the outer end of the actuator arm such that when the actuator arm is in an outward position the operating lever actuator element contacts and retains the operating lever in a first position such that the electrical switch is in a first state of operation, and when the actuator arm is in an inward position the operating lever is in a second position toward the stem relative to the first position such that the electrical switch is in a second state of operation;

a bias spring biasing the actuator arm toward the inward position; and an adjustment nut mounted to the outer end of the actuator arm adjacent the operating lever actuator element, the operating lever actuator element and the adjustment nut configured to be adjusted along a longitude of the actuator arm to change a distance the operating lever actuator element must travel in order to put the operating lever in the first position.

2. The limit switch assembly of claim 1, wherein the first state of operation is a state of activation, and the second state of operation is a state of inactivation.

3. The limit switch assembly of claim 1, further comprising a base plate having a plurality of feet to mount the base plate on an exterior of a valve yoke.

4. The limit switch assembly of claim 1, further comprising a base plate configured to mount to an exterior of a valve yoke, the base plate having a wedge shape.

5. The limit switch assembly of claim 1, further comprising a mounting boss and a mounting plate, the mounting boss configured to be secured to an inside of a valve yoke, to extend through a side of the valve yoke, and to attach to the mounting plate, the mounting plate configured to attach to an exterior side of the valve yoke.

* * * * *